Patented Nov. 28, 1950

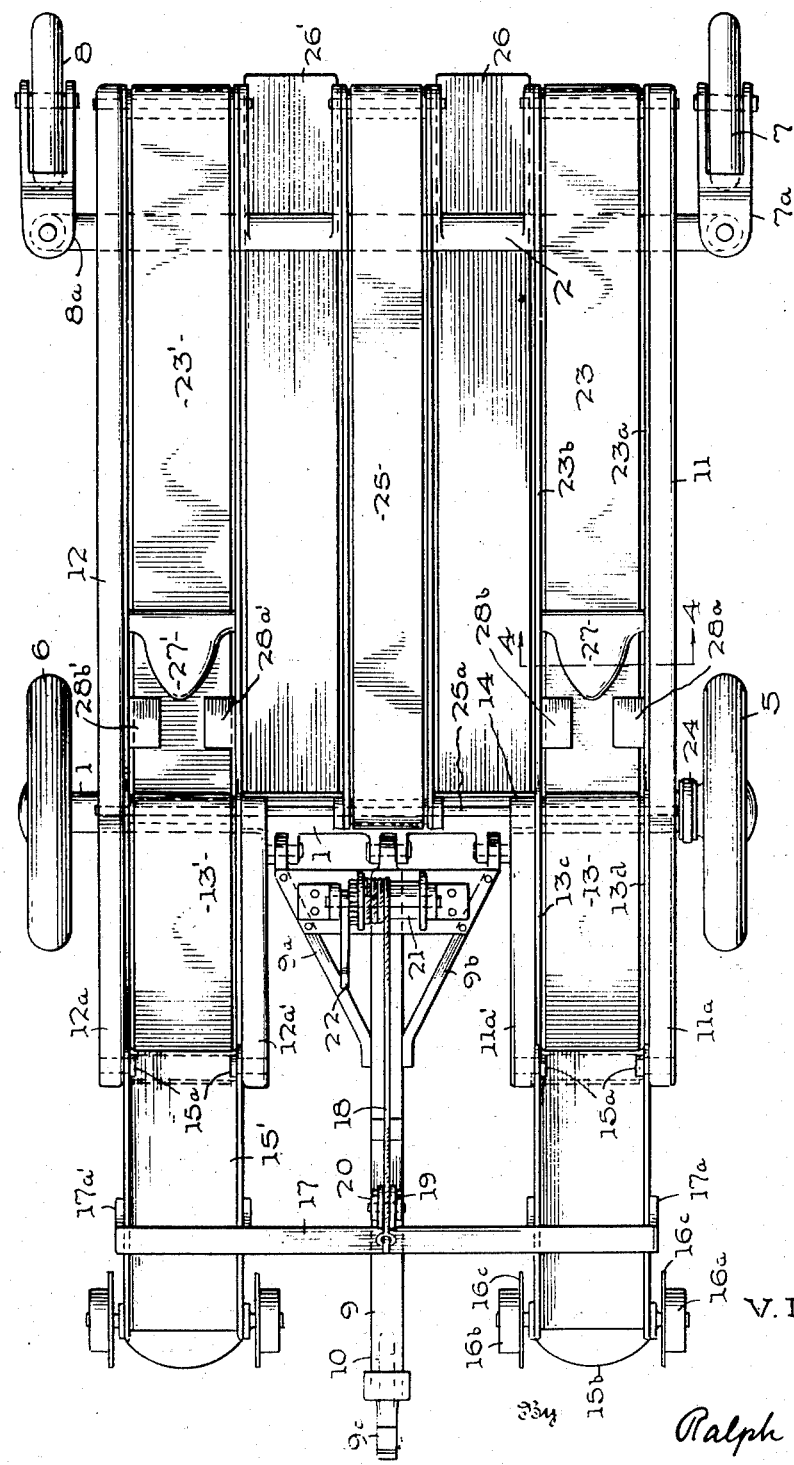

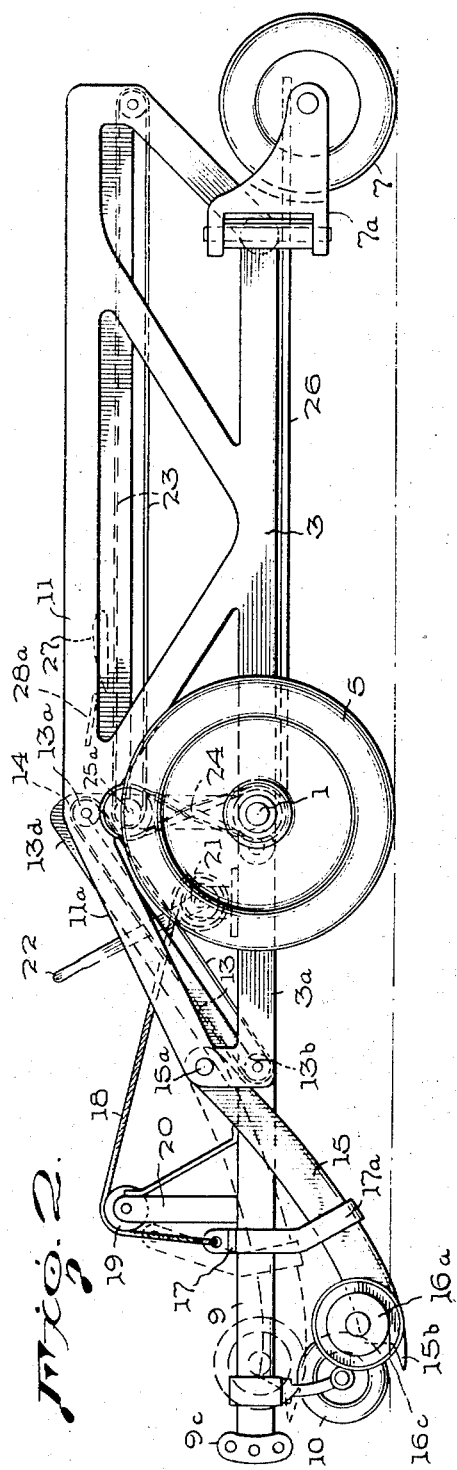

2,532,169

UNITED STATES PATENT OFFICE 2,532,169

POTATO HARVESTING MACHINE

Vivian Duff Jones, Baltimore, Md.

Application December 20, 1945, Serial No. 636,162

5 Claims. (Cl. 55—51)

This invention relates to harvesting machines and especially to machines for harvesting potatoes or other tuber plants.

The harvesting machine of my invention is especially designed for harvesting sweet potatoes, and one object is to provide an arrangement for severing the major part of the vines of the potato at the ground and preventing the severed vines from entering the harvesting machine.

My harvesting machine is of the type which scoops up a strip of soil or earth containing the row of potatoes to be harvested and elevates the strip into the machine where the potatoes are removed from the soil, and one object is to devise improved means for separating the potatoes from the soil.

A further object is to devise a machine for harvesting two parallel rows of potatoes simultaneously by separate digging scoops and separate conveyors for the two strips of soil containing the potatoes, and to provide a common conveyor between the two soil conveyors and located in a position convenient for the manual transfer of the potatoes from the two soil conveyors onto the common potato conveyor. The harvester is provided with two platforms on opposite sides of the common potato conveyor where operators may stand and remove the remaining vines from the potatoes and transfer them to the common conveyor.

Other objects of my invention will appear from the following description having reference to the attached drawing.

In the drawing, which is rather diagrammatic,

Figure 1 is a plan view of the preferred form of my harvesting machine;

Figure 2 is a side elevational view of the harvesting machine;

Figure 3 is a rear end view of the harvesting machine; and

Figure 4 is a sectional view of Fig. 1 taken along line 4—4.

Referring to Figure 1, the machine is provided with a rigid frame or chassis including a front axle 1, a rear axle 2, and two side beams or bars 3 and 4 connecting the two axles. Mounted at the ends of axle 1 are two supporting wheels 5 and 6 which also serve for driving the conveyors of the machine as explained below. A pair of supporting wheels 7 and 8 are mounted at the ends of rear axle 2 by swivel mountings 7a and 8a.

A tongue or drawbar 9 is pivotally connected with the front axle 1 to swing in a vertical plane but is held against movement in a horizontal plane with respect to the axle 1 by means of a pair of braces 9a and 9b. The front end of drawbar 9 is supported by a swivel-mounted wheel 10 which follows the surface of the ground over which the machine operates. The drawbar 9 is provided with a coupling 9c at its front end for coupling the harvester to a tractor or other pulling machine.

The frame of the machine is of a width such that the wheels 5 and 6 span two rows of potatoes. On each side of the horizontal frame or chassis there is a vertical side frame, one having an upper horizontal rail 11 and the other an upper horizontal rail 12 located substantially above side beams 3 and 4 respectively. As shown in Figures 1 and 2, rails 11 and 12 extend forwardly of the axle 1 and are inclined downwardly at 11a and 12a to connect with extensions of side bars 3 and 4 respectively extending forwardly of axle 1. Corresponding frame sections 11a' and 12a' are arranged in spaced relation to sections 11a and 12a respectively, and horizontal frame sections 3a' and 4a' are arranged immediately below frame sections 11a' and 12a' parallel with frame extensions 3a and 4a, respectively. The frame members 3a' and 4a' are not visible in the drawing, but they are positioned immediately below the members 11a' and 12a' in Figure 1 and lie in the same plane as the member 3a in Figure 2. An elevating conveyor is mounted between frame sections 11a and 11a' and is formed of an endless belt 13 which passes around a roll 13a positioned immediately above axle 1 and journaled between the rail 11 and the vertical standard 14 mounted on the axle 1. At its lower end, the conveyor belt 13 is supported by a roll 13b which is journaled between frame extensions 3a and 3a'. A pair of guard plates 13c and 13d are provided on opposite sides of the conveyor belt 13. A similar conveyor belt 13' is provided at the opposite side of the machine between frame extensions 12a and 12a'.

A digging scoop or trough 15 formed of an open channeled member is pivoted at its rear end on a horizontal axis 15a between frame extensions 11a and 11a' and is arranged so that the material passing through the scoop and discharged from the rear end thereof is deposited upon the elevating conveyor belt 13 which carries the material upwardly. The front end of the scoop 15 is provided with a removable cutting blade 15b which engages the ground and scoops or cuts from the ground a strip of soil containing the potatoes to be harvested. The front end of scoop 15 is also provided with a pair of supporting wheels 16a and 16b on opposite sides thereof. These wheels have relatively broad rims which roll over the surface of the ground and serve to maintain the cutting end of the scoop at a predetermined cutting depth. These wheels are also provided with coulter discs or flanges 16c which serve to sever the potato vines on each side of the row being scooped. An identical scoop arrangement is provided on the opposite side of the machine as shown at 15'.

The normal operating position of the two digging scoops is shown in solid lines in Figure 2. When it becomes necessary to turn the machine around, these scoops must be raised to an elevated position above the ground, shown in dotted lines, and for this purpose a crossbar 17 is arranged transversely of the drawbar 9 and extends over each digging scoop. Suitable connections shown at 17a and 17a' are provided between the crossbar 17 and the two scoops 15 and 15', respectively, and both scoops are raised simultaneously into elevated position by means of a cable 18 attached at its forward end to the middle of bar 17 and passing over a pulley 19 mounted upon a bracket 20 supported on the drawbar 9. The rear end of cable 18 is attached to a suitable pulling device such as a winding drum 21 mounted on drawbar 9. The drum may be rotated by a ratchet lever 22 and held in any given position by a releasable pawl.

Mounted on one side of the chassis adjacent top rail 11 is a horizontal conveyor belt 23, the front end of which is positioned beneath the rear end of elevating conveyor belt 13 and receives material discharged from the elevating conveyor. Conveyor belts 13 and 23 are driven rearwardly by suitable driving connection with supporting wheel 5, the driving connection to one roll of belt 23 being represented diagrammatically by the crossed belt 24 in Figure 2. The upper roll of belt 13 may be driven from the driven roll of belt 23 by a pair of meshing gears, not shown. Conveyor belt 23 is provided with fixed side plates 23a and 23b. A similar horizontal conveyor belt 23' is mounted on the opposite side of the chassis adjacent the top rail 12. This conveyor belt and elevating conveyor belt 13' is driven from supporting wheel 6 by a suitable driving connection as explained above.

A third horizontal conveyor belt 25 is mounted midway between conveyor belts 23 and 23', and this belt is also driven rearwardly by a suitable connection such as shaft extension 25a from the driven roll of belt 23. On opposite sides of the central conveyor 25, two platforms 26 and 26' are provided, and one or more operators may stand on these platforms and transfer the potatoes from the outer belts 23 and 23' onto the central belt 25. The platforms 26 and 26' are supported from the chassis and they may be located either above or below the axles 1 and 2.

For the purpose of separating the potatoes from the soil or dirt, especially where the soil is caked or hardened, I provide a splitter element 27 near the front end of conveyor belt 23. The splitter is formed of a pointed member having a rounded upper surface with a flat lower surface facing the belt 23 with small clearance. The splitter 27 is supported between side plates 23a and 23b by lateral extensions on the splitter. A section of the splitter along the line 4—4 in Figure 1 is shown in Figure 4. In operation, the splitter acts in the same manner as a plow and breaks the strip of soil by raising the middle above the outer portions. For the purpose of making the splitting action more effective, a pair of presser plates 28a and 28b are supported from side walls 23a and 23b and extend over the side portions of the strip of soil being conveyed on the belt 23. These plates may be formed of resilient material and mounted with their forward ends elevated with respect to the rear ends as shown in Figure 2, so as to press down upon the side portions of the soil strip as it is fed to the splitter 27. If desired, the rear ends of presser plates 28a and 28b may be unsupported so that they are free to follow the irregularities of the soil strip while at the same time exerting a pressing action on the strip. A corresponding splitter and presser plate arrangement is provided for conveyor belt 23' as shown at 27', 28a' and 28b'.

The conveyor belts 13, 13', 23 and 23' may be formed of any suitable flexible material and may be imperforate, but I prefer to form the belts of perforated structure, or of link-belt structure in order to allow the soil from the earth strip to pass through the belts as the strip moves rearwardly of the machine.

The operation of the machine is believed to be clear from the foregoing description. The two scoops 15 and 15' operate to scoop up two strips of earth on adjacent rows and containing the potatoes to be harvested. The two strips are forced rearwardly through the scoops and onto the elevating conveyors 13 and 13', and as the strips pass up these conveyors, part of the loose dirt falls through the conveyor holes and the remainder is deposited on conveyors 23 and 23'. After the strips pass splitter elements 27 and 27', the operators standing on platforms 26 and 26' remove the remainder of the vines from the potatoes and transfer the potatoes onto the central conveyor 25. The remaining dirt and trash in the two strips is conducted rearwardly on conveyors 23 and 23' and drops to the ground at the rear of the machine. The potatoes deposited on a central conveyor 25 are conveyed rearwardly and deposited in a single row on the ground, but preferably, the potatoes are deposited in a trailer wagon (not shown) attached to the rear of the harvesting machine.

Various modifications of my harvesting machine will be obvious to those skilled in the art, and my protection is to be limited only in accordance with the attached claims.

What I claim is:

1. A harvesting machine comprising, in combination, a wheeled chassis, a pair of digging scoops mounted at the front of said chassis on opposite sides thereof, an elevating conveyor for each digging scoop mounted on said chassis independently of said scoop and positioned to receive the material discharged from the rear end of the associated scoop, a pair of horizontal conveyors mounted on opposite sides of said chassis and positioned to receive the material discharged from the rear ends of said elevating conveyors, a central conveyor located midway between said pair of horizontal conveyors, said pair of conveyors being spaced from said third conveyor to provide an operator space between the third conveyor and each conveyor of said pair of conveyors, and a pair of horizontal operator platforms mounted on said chassis in said operator spaces at opposite sides of said central conveyor.

2. A harvesting machine according to claim 1 wherein each digging scoop is pivotally connected at its rear end with said chassis on a horizontal axis, and including means for supporting the front end of each scoop for a predetermined digging depth comprising a pair of broad-rimmed supporting wheels mounted on opposite sides of the front end of each scoop.

3. A harvesting machine according to claim 1 wherein each digging scoop is pivotally connected at its rear end with said chassis on a horizontal axis, and including means for supporting the front end of each scoop for a predetermined digging depth comprising a pair of broad-rimmed supporting wheels mounted on opposite sides of the front end of each scoop, and common means for simultaneously elevating the front ends of said pair of scoops above the surface of the ground.

4. A harvesting machine comprising, in combination, a chassis having a pair of supporting wheels mounted on opposite sides of the front end thereof, a pair of swivel-mounted supporting wheels on opposite sides of the rear end of said chassis, a pair of digging scoops mounted at the front end of said chassis, a pair of elevating conveyors mounted on opposite sides of said chassis independently of said scoops and positioned to receive material discharged from the rear ends of said scoops, a pair of horizontal conveyors mounted on opposite sides of said chassis and positioned to receive material discharged from the rear ends of said elevating conveyors, means for driving said elevating conveyors and said horizontal conveyors from the front supporting wheels of said chassis, a third horizontal conveyor mounted midway between said pair of horizontal conveyors, said pair of horizontal conveyors being spaced from said third conveyor to provide an operator space between the third conveyor and each conveyor of said pair of conveyors, means for driving said third conveyor from one of said front wheels, and a pair of operator platforms arranged in said operator spaces on opposite sides of said third horizontal conveyor.

5. In a harvesting machine, the combination of means for picking up a row of dirt as the machine moves over a field, a moving conveyor belt positioned to receive said row of dirt, a pair of stationary side walls arranged on opposite sides of said belt, a splitter element mounted between said side walls above said moving belt, and having a pointed portion directed against the direction of movement of said belt and in the path of said dirt, said pointed portion being rounded on top and having a flat lower surface facing said belt with small clearance, and a pair of presser plates mounted on said side walls adjacent the end of the pointed portion of said splitter and arranged to bear against the top side portions of said row of dirt.

V. DUFF JONES.

REFERENCES CITED

The following references are of record in the file of this patent:

UNITED STATES PATENTS

| Number | Name | Date |
|---|---|---|
| 473,083 | Reuther | Apr. 19, 1892 |
| 640,754 | Denis | Jan. 9, 1900 |
| 882,333 | Moldenhauer | Mar. 17, 1908 |
| 965,667 | Thompson | July 26, 1910 |
| 969,690 | Headland | Sept. 6, 1910 |
| 2,215,516 | Schooler | Sept. 24, 1940 |
| 2,230,391 | Standlee | Feb. 4, 1941 |
| 2,373,426 | Spafford | Apr. 10, 1945 |

FOREIGN PATENTS

| Number | Country | Date |
|---|---|---|
| 17,372 | Australia | of 1928 |
| 47,428 | Hungary | Dec. 21, 1909 |